Aug. 28, 1951   R. A. ROBERTS   2,566,034
CAM AND FOLLOWER MECHANISM FOR COMPLEX MOTION
Filed Feb. 1, 1946

*INVENTOR.*
REX A. ROBERTS
BY
ATTORNEY

Patented Aug. 28, 1951

2,566,034

UNITED STATES PATENT OFFICE 2,566,034

CAM AND FOLLOWER MECHANISM FOR COMPLEX MOTION

Rex A. Roberts, Belmont, Mass., assignor, by mesne assignments, to the United States of America as represented by the Secretary of the Navy Application February 1, 1946, Serial No. 644,981

2 Claims. (Cl. 74—84)

This invention relates to cam and follower mechanism and more particularly to drive a cam follower to produce an output motion whose graph is proportional to the function of $1/\sin \theta$.

In the construction of ultrasonic trainers there is a simulator which initiates the Doppler effect. To accomplish this result, a voltage is needed the graph of which is proportional to the function of $1/\sin \theta$, i. e. periodically rapidly increase from zero to infinity and, after a time interval, rapidly return to zero. Since it would be very difficult to wind a potentiometer to follow such a curve, the present invention was designed to turn the shaft of a variable potentiometer with a motion that approximately follows the desired function.

An object of this invention is to provide a driving mechanism for causing periodic rotation of one shaft in response to continuous rotation of a second shaft.

Another object of this invention is to provide a driving mechanism for converting continuous rotary motion into periodic rotary motion of a variable speed.

Still another object of this invention is to provide a driving mechanism for causing periodic rotation at a variable speed of one shaft in response to rotation of a second shaft.

A further object of this invention is to provide a driving mechanism for periodically rotating at a variable speed, the shaft of a variable potentiometer in response to rotation of a second shaft.

A still further object of this invention is to provide a driving mechanism for periodically rotating one shaft in such a manner that the output of said shaft is proportional to $1/\sin \theta$.

Further objects and advantages of this invention will be apparent from the following specification and claims when taken in connection with the accompanying drawings, in which:

Figure 1:
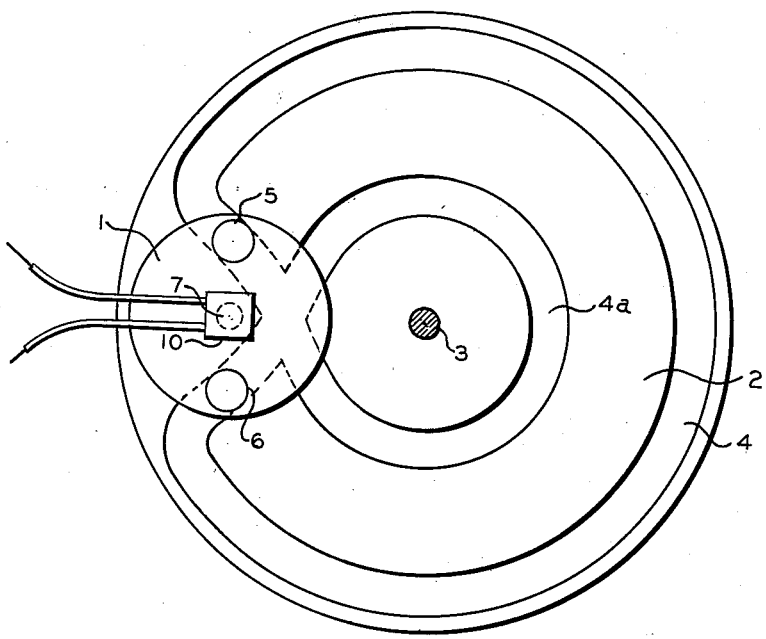
Fig. 1 is a plan view of a cam follower constructed in accordance with the principles of this invention.

Although the apparatus of this invention may be made in several forms, it is herein disclosed in Fig. 1 as a cam follower 1 operatively connected to a cam 2, having an input shaft 3 fixedly secured thereto and extending transverse thereto. Intersecting grooves 4 and 4a cut in the surface of the cam have the particular configuration disclosed. Cam follower 1 is operatively connected to the grooves of cam 2 by diametrically opposed follower pegs 5, 6. At the center of the cam follower is an output shaft 7 fixedly secured thereto and extending transverse thereto. A suitable variable potentiometer 10 is mounted on one end of shaft 7 as shown. While no particular means for driving shaft 3 is shown, it will readily be understood that both shafts 3 and 7 may be rotatably mounted by means of any suitable bearings (not shown) disposed on opposite sides of the cam and cam follower respectively, and that shaft 3 may be operatively connected to any suitable driving means such as an electric motor (not shown). Potentiometer 10, which is a variable potentiometer of standard construction may have the sliding contact thereof operatively connected to shaft 7 in any suitable manner as for example, a suitable clamp (not shown).

Figure 3:
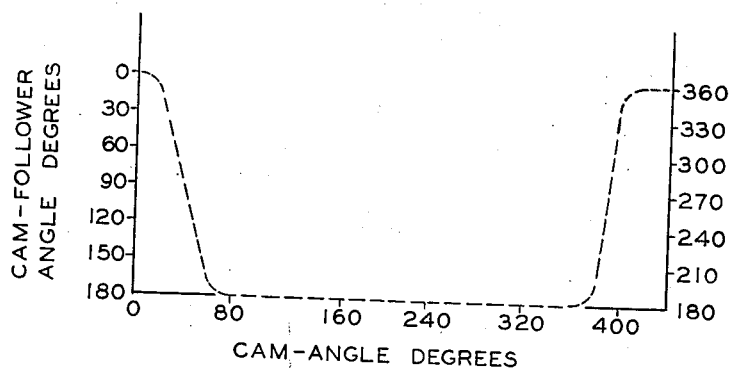
Fig. 3 is a graph showing relation between cam-angle degrees and cam follower-angle degrees.
Figure 2:
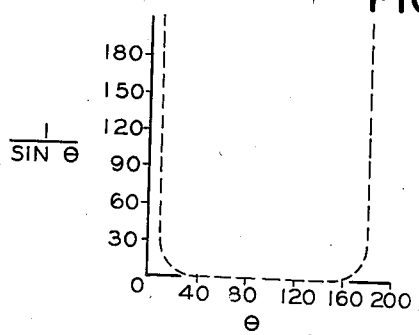
Fig. 2 is a graph showing relation between $\theta$ and $1/\sin \theta$.

In operation, rotative motion of shaft 3 will be transferred from input shaft 3 to output shaft 7 through the action of diametrically opposed follower pegs 5 and 6 which are slidably mounted in interlaced grooves 4 and 4a of cam 2. As shown, grooves 4 and 4a each consist of a geometrically symmetrical concentric portion and an eccentric portion by which the desired function of motion is accomplished. During the portion of the cycle of rotation in which cam follower pegs 5 and 6 lie in the concentric portions of the grooves, no rotation of shaft 3 is transmitted to shaft 7. However, during the portion of the cycle of rotation of shaft 3 in which cam followers 5 and 6 lie in the eccentric portion of grooves 4 and 4a, shaft 7 is caused to rotate in response to rotation of shaft 3. More specifically, due to the particular configuration of the intersecting grooves, the cam follower will be forced into a rapid rotation of 180° at a varying rate and will then suddenly stop. The particular cam shown is so designed that cam follower 1 (and shaft 7) is rotated through one hundred eighty degrees while cam 2 (and shaft 3) is rotated through an angle of seventy (70°) degrees. Thereafter, there is no rotation of shaft 7 during the succeeding two hundred ninety (290°) degrees of rotation of shaft 3. It will readily be understood that grooves 4 and 4a may be so designed as to cause shaft 7 to rotate at a variable speed in response to a constant speed of rotation of shaft 3 during that portion of the rotative cycle in which rotation of shaft 7 is accomplished. The results of the particular groove configuration illustrated in Fig. 1 are graphically shown in Fig. 3, as compared to an ideal $$\frac{1}{\sin \theta}$$

curve shown in Fig. 2. Thus, rotation of shaft 7 is proportional to the expression $$\frac{1}{\sin \theta}$$

where $\theta$ is the angle of rotation of shaft 3.

The invention described in the foregoing specification need not be limited to the particular details shown which are considered to be illustrative only, of one form of the invention.

What is claimed is:

1. Apparatus for producing a motion in accordance with a complex function from a simple rotary motion comprising a driven shaft, a disk mounted on said shaft and provided with two followers located on the face thereof at diametrically opposed points, a continuously rotating shaft, a rotatable driving member mounted on said rotating shaft, and two cam tracks formed on said member and arranged each to receive one of said two followers, said tracks having a concentric portion adapted to lock said disk through said followers against rotation and an eccentric portion adapted to transfer said followers from one of said tracks to the other to rotate said disk and hence said driven shaft substantially in accordance with said complex function.

2. Apparatus for varying an electrical value in accordance with the complex function $1/\sin \theta$ from a simple rotary motion where $\theta$ is the angle of rotation, comprising an electrical potentiometer having an adjustable contact movable by a driven shaft, a disk mounted on said shaft and provided with two followers located on the face thereof at diametrically opposed points, a continuously rotating shaft, a rotatable driving member mounted on said rotating shaft, and two cam tracks formed on said member and arranged each to receive one of said two followers, said tracks having a concentric portion adapted to lock said disk through said followers against rotation and an eccentric portion adapted to transfer said followers from one of said tracks to another to rotate said driven shaft to vary said potentiometer contact substantially in accordance with said function.

REX A. ROBERTS.

REFERENCES CITED

The following references are of record in the file of this patent:

UNITED STATES PATENTS

| Number | Name | Date |
| --- | --- | --- |
| 2,082,093 | Bedford | June 1, 1937 |
| 2,181,432 | Jensen | Nov. 28, 1939 |